(12) United States Patent
Kuo et al.

(10) Patent No.: US 7,832,931 B2
(45) Date of Patent: Nov. 16, 2010

(54) BALL CONNECT DEVICE FOR A LINEAR GUIDEWAY

(75) Inventors: Chang-Hsin Kuo, Taichung (TW); Ya-Hui Liao, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 386 days.

(21) Appl. No.: 12/038,102

(22) Filed: Feb. 27, 2008

(65) Prior Publication Data

US 2008/0144982 A1 Jun. 19, 2008

Related U.S. Application Data

(63) Continuation-in-part of application No. 11/264,838, filed on Nov. 1, 2005, now abandoned.

(51) Int. Cl.
*F16C 29/06* (2006.01)
(52) U.S. Cl. .......................... 384/45; 384/51
(58) Field of Classification Search ............ 384/43–45, 384/49, 51, 523–534, 614
See application file for complete search history.

(56) References Cited

U.S. PATENT DOCUMENTS

| 1,224,624 | A | * | 5/1917 | Fjellman | 384/529 |
| 1,577,211 | A | * | 3/1926 | Petrus | 384/528 |
| 2,566,421 | A | * | 9/1951 | Lapointe | 384/526 |
| 3,918,777 | A | * | 11/1975 | Kitchin | 384/528 |
| 4,655,613 | A | * | 4/1987 | Yokota | 384/49 |
| 4,701,059 | A | * | 10/1987 | Yokota | 384/49 |
| 6,070,479 | A | * | 6/2000 | Shirai | 74/424.88 |
| 6,116,783 | A | * | 9/2000 | Shirai et al. | 384/43 |
| 2002/0118898 | A1 | * | 8/2002 | Blaurock et al. | 384/43 |

\* cited by examiner

*Primary Examiner*—Thomas R Hannon
(74) *Attorney, Agent, or Firm*—Rosenberg Klein & Lee

(57) ABSTRACT

A ball connect device for a linear guideway comprises: at least one ribbon-shaped connecting portion in which being formed a plurality of retaining holes for retaining a plurality of balls, and a plurality ring portions being protruded out a surface of the connecting portion and each of the ring portions being formed around the respective retaining holes to circle around the balls. The retaining holes each has two open ends that are located at both sides of the ribbon-shaped connecting portion, a diameter of one of the two open ends is near a diameter of the balls for easy installation of the balls into the ball connect device, and a diameter of another one of the two open ends is smaller than the diameter of the balls so as to prevent disengagement of the balls.

9 Claims, 6 Drawing Sheets

BALL CONNECT DEVICE FOR A LINEAR GUIDEWAY

BACKGROUND OF THE INVENTION

1. Field of the Invention

This application is a continuation of part of U.S. patent application Ser. No. 11/264,838, which claims the benefit of the earlier filing date of Nov. 1, 2005 now abandoned.

2. Description of the Prior Art

Two neighboring balls in a linear guideway always rotate in the same direction, that is, the contact portions of the two neighboring balls move in opposite direction relative to each other, this will lead to an increase of the friction and resistance of the linear guideway, and will cause unpleasing noise. To solve these problems, the neighboring balls of a linear guideway are usually separated from one another by a plurality of ball retainers.

Currently, the existing ball retainers generally include two types: the first type of ball retainer is an independent unit, and the second type of ball retainer is an assembly consisted of a plurality of independent units that are connected to one another. The ball retainer 41 consisted of a plurality of independent units as shown in FIG. 6 comprises a plurality of partitions 411 connected to one another by a flexible chain 412. The partitions 411 are spaced apart from one another to define a plurality spaces with respect to chain 412 for accommodation of a plurality of balls 30. In production of this type of ball retainer 41, the balls 30 must be placed into the mold in advance, this production method has a strict requirement on the quality of the plastic material and the plastic molding machine, thus relatively increasing the production cost. In addition, this special production method makes the balls 30 come into a very tight contact with the partitions 411 of the retainer 41, accordingly, the rotating resistance of the balls 30 will be relatively large.

U.S. Pat. No. 1,224,624 discloses another conventional ball connecting structure, but it is an annular structure used in particularly in bearings but not in linear guideway, therefore, its connecting portion is also annular. Further, the ring portions (for retaining the rolling elements) are assembled to but not integral with the connecting portion, they need to be produced separately and then assembled together, and this is inconvenient.

The present invention has arisen to mitigate and/or obviate the afore-described disadvantages.

SUMMARY OF THE INVENTION

The primary objective of the present invention is to provide a ball connect device for a linear guideway that comprises: a plurality of balls; at least one ribbon-shaped connecting portion in which being formed a plurality of retaining holes for retaining a plurality of balls, and a plurality ring portions being integrally extended out of a surface of the connecting portion and each of the ring portions being formed around the respective retaining holes to circle around the balls. The balls in the retaining holes are retained in the retaining holes of the linear ribbon-shaped connecting portion, and then the linear ribbon-shaped connecting portion and the balls as a whole are placed into the linear guideway together to perform linear circulation in such a manner that the balls roll linearly between components of the linear guideway.

Each of the retaining holes has two open ends, a diameter D1 of one of the two open ends of the respective retaining holes is near a diameter D of the balls for easy installation of the balls, and a diameter D2 of another one of the two open ends of the retaining holes is smaller than the diameter D of the balls so as to prevent disengagement of the balls.

After studying the elongation of the polymer material and the stress causing the elongation, applicant concludes that the diameter D1 of one of the two open ends of the respective retaining holes is preferably not less than 0.9 D (D1≧0.9 D). The balls can be easily installed into the ball connect device even when the elongation of diameter D1 is as low as 10%. and to prevent the disengagement of the balls from another open end, D2 is preferably≦0.85 D, under this condition, only when the elongation D2 is over 15%, the balls will probably disengage from the retaining hole.

The distance between the neighboring balls can also be adjusted appropriately. Each pair of neighboring balls can be connected to each other to reduce the distance between the balls, and thus a ball connect device of the same length can accommodate more balls. On the other hand, neighboring balls can be separated from each other to increase the distance between the balls, and thus the number of ball accommodated by a ball connect device of the same length will be relatively small.

In addition, the connecting portion of the ball connect device in accordance with the present invention can be located in or away from the central axis of the balls, each of the ring portions is located at both sides or only at one side of the connecting portion. One of the two open ends of the respective retaining holes can be a flared or tapered aperture.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
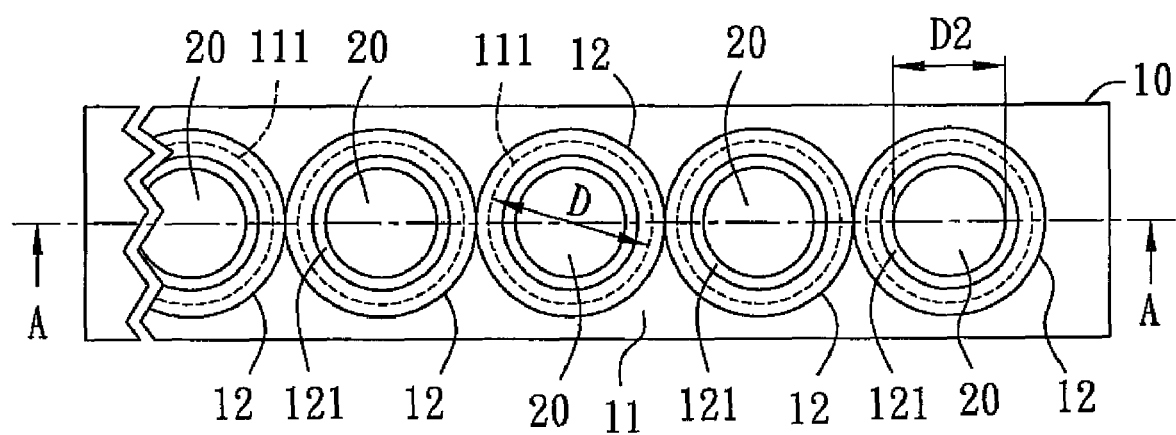
FIG. 1 is a top view of showing a ball connect device for a linear guideway.
Figure 2:
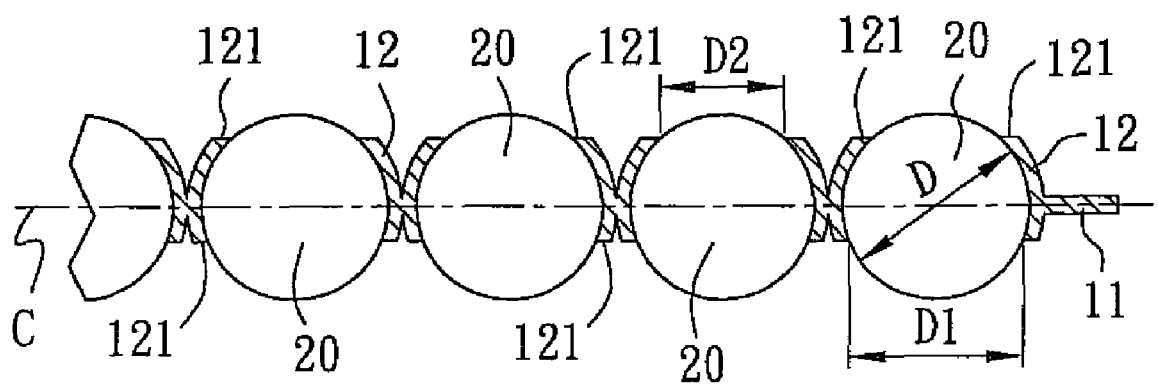
FIG. 2 is a cross sectional view taken along the line A-A of FIG. 1.

FIG. 1 is a top view of showing a ball connect device for a linear guideway, and FIG. 2 is a cross sectional view taken along the line A-A of FIG. 1. The ball connect device 10 comprises: a plurality of balls 20, at least one ribbon-shaped connecting portion 11 and a plurality of ring portions 12. The ring portions 12 integrally extend out of the surface of the connecting portion 11, that is, the ring portions 12 are integral with and connected by the connecting portion 11, and the plurality of balls 20 is ratably received in a plurality of retaining holes 111 that are longitudinally defined in the ribbon-shaped connecting portion 11. The respective ring portions 12 are formed around the perimeter edge of the retaining holes 111 and serve to circle around and hold the balls 20. Since the ring portions 12 circled around the retaining holes 111 provide assistance to the retaining holes 111 in retaining the balls 20, the balls will be kept firmly in the retaining holes when the ball connect device 10 turns a corner. In this embodiment, the connecting portion 11 is located in the central axis C of the balls 20, so that the center of the balls 20 will approach the connecting portion 11 when the connecting portion 11 bends. Both ends of the respective ring portions 12 are cut to form a flat surface 121 and to make the thickness of the ring portions 12 the same, and the balls 20 partially protrude out of the flat surface 121 at either side of the respective ring portions 12, this arrangement can prevent the interference of the ring portions 12 with respect to the rolling path or the rolling groove in the sliding block. In addition, each of the ring portions 12 is located at both sides of the connecting portion 11 in such a manner that the portion of the ring portion 12 at one side of the connecting portion 11 is unequal in size to that at the other side of the connecting portion 11. The retaining holes 111 12 each has two open ends, the diameter D1 of one of the two open ends is near the diameter D of the balls 20 for easy installation of the balls 20 into the ball connect device 10, and the diameter D2 of another one of the two open ends is smaller than the diameter D of the balls 20 so as to prevent the disengagement of the balls 20 from this open end.

Figure 3:
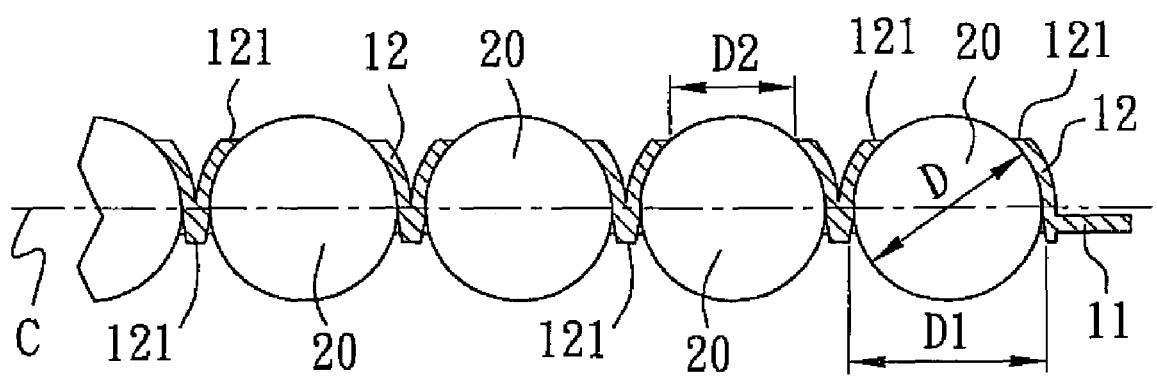
FIG. 3 is a cross sectional view of showing a ball connect device for a linear guideway in accordance with a second embodiment of the present invention.

FIG. 3 is a cross sectional view of showing a ball connect device for a linear guideway in accordance with a second embodiment of the present invention. The respective ring portions 12 are also located at both sides of the connecting portion 11 and each pair of neighboring balls 20 are connected to each other, thus reducing the distance between the neighboring balls 20, and accordingly a ball connect device of the same length can accommodate more balls 20. One of the two open ends of the ring portions 12 is a flared aperture and its diameter D1 is larger than the diameter D of the balls 20, and the diameter D2 of another one of the two open ends of the retaining holes 111 is smaller than the diameter D of the balls 20, so that the connecting portion 11 is not aligned with the center of the balls and is located at one side of the central axis of the balls 20 only. Both ends of the respective ring portions 12 are cut to form a flat surface 121 and to make the thickness of the ring portions 12 the same.

Figure 4:
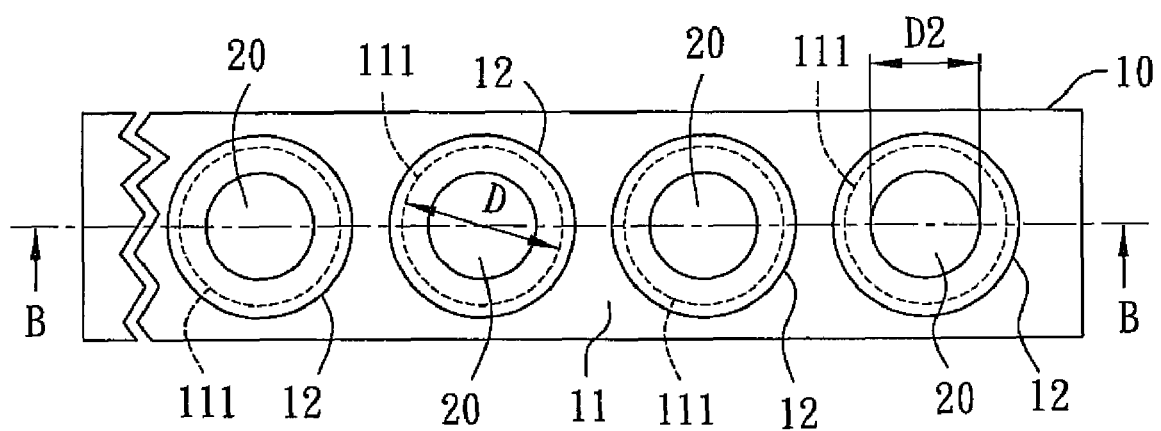
FIG. 4 is a top view of showing a ball connect device for a linear guideway in accordance with a third embodiment of the present invention.
Figure 5:
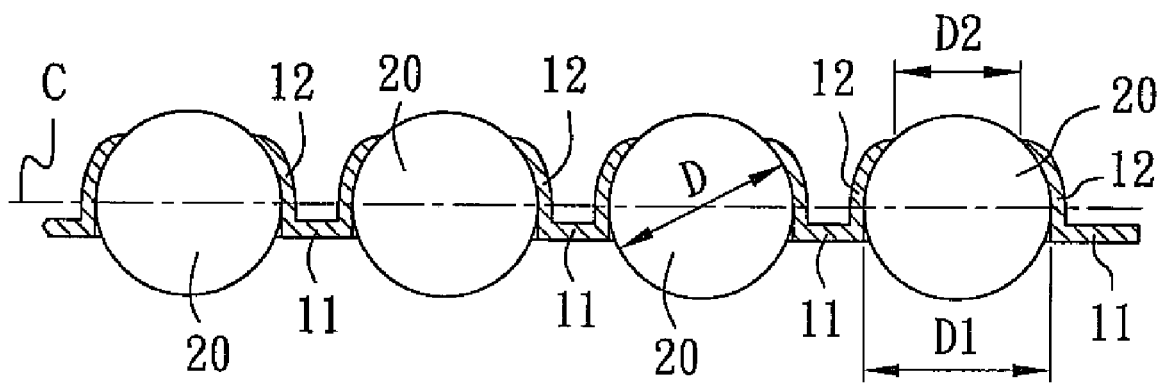
FIG. 5 is a cross sectional view taken along the line B-B of FIG. 4.
Figure 6:
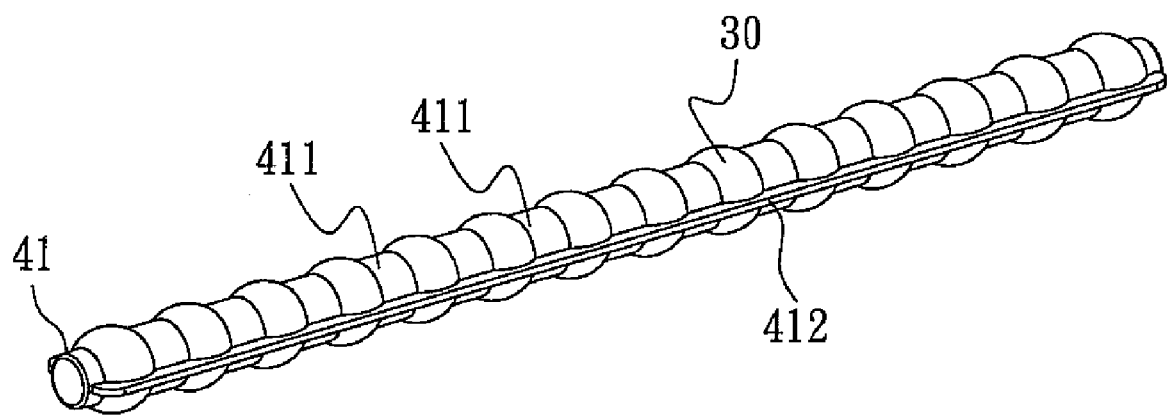
FIG. 6 is a schematic illustration view of a conventional ball retainer.

FIG. 4 is a top view of showing a ball connect device for a linear guideway in accordance with a third embodiment of the present invention. FIG. 5 is a cross sectional view taken along the line B-B of FIG. 4. The ball connect device 10 also comprises a ribbon-shaped connecting portion 11 and a plurality of ring portions 12. The ring portions 12 are connected to one another by the connecting portion 11, that is, the ring portions 12 don't contact each other, and a plurality of balls 20 are ratably received in a plurality of retaining holes 111 that are longitudinally defined in the ribbon-shaped connecting portion 11. The respective ring portions 12 are arranged around the perimeter edge of the retaining holes 111 and serve to circle around and hold the balls 20. In this embodiment, the ring portions 12 are located at a side of the connecting portion 11, the diameter of one of the two open ends s of the retaining holes 111 is equal to the diameter D of the balls 20, and the diameter D2 of another one of the two open ends s of the retaining holes 111 is smaller than the diameter D of the balls 20. The connecting portion 11 is located at a side of the central axis C of the balls, and the distance between each pair of neighboring balls is relatively large as compared to the previous two embodiments, so that the neighboring ring portions 12 are out of contact with each other. Therefore, the ball connect device 10 of this embodiment has a better bending flexibility.

While we have shown and described various embodiments in accordance with the present invention, it should be clear to those skilled in the art that further embodiments may be made without departing from the scope of the present invention.

What is claimed is:

1. A ball connect device for a linear guideway being placed in the linear guideway and cooperating with a plurality of balls to perform linear motion along the linear guideway, characterized in that the ball connect device comprises:
    at least one linear ribbon-shaped connecting portion in which being formed a plurality of retaining holes for retaining the plurality of balls;
    a plurality of ring portions integrally extending from a surface of the connecting portion and each of the ring portions being formed around the respective retaining holes to circle around the balls, wherein the retaining holes each has two open ends, a diameter of each of the balls is D, a diameter of one of the two open ends of the respective retaining holes is D1, a diameter of the other one of the two open ends of the respective retaining holes is D2, and they satisfy the relations: $D1 \geqq 0.9\ D$, and $D2 \leqq 0.85\ D$.

2. The ball connect device for a linear guideway as claimed in claim 1, wherein the connecting portion is located in a central axis of the balls.

3. The ball connect device for a linear guideway as claimed in claim 1, wherein the connecting portion is located at a side of a central axis of the balls.

4. The ball connect device for a linear guideway as claimed in claim 1, wherein each of the ring portions is located at both sides of the connecting portion in such a manner that a portion of each ring portion at one side of the connecting portion is unequal in size to that at the other side of the connecting portion.

5. The ball connect device for a linear guideway as claimed in claim 1, wherein each of the ring portions is located at one side of the connecting portion only.

6. The ball connect device for a linear guideway as claimed in claim 1, wherein each pair of neighboring ring portions contact each other.

7. The ball connect device for a linear guideway as claimed in claim 1, wherein each pair of neighboring ring portions don't contact each other.

8. The ball connect device for a linear guideway as claimed in claim 1, wherein a flat surface is formed on each of the ring portions.

9. The ball connect device for a linear guideway as claimed in claim 1, wherein a diameter of the other one of the two open ends is equal to the diameter of the balls.

* * * * *